US007396197B2

(12) United States Patent
Lawson

(10) Patent No.: US 7,396,197 B2
(45) Date of Patent: Jul. 8, 2008

(54) FORCE-BALANCED AIR SUPPLY FOR PNEUMATIC TOOLS

(75) Inventor: Douglas K. Lawson, Chapel Hill, NC (US)

(73) Assignee: ATI Industrial Automation, Inc., Apex, NC (US)

(*) Notice: Subject to any disclaimer, the term of this patent is extended or adjusted under 35 U.S.C. 154(b) by 418 days.

(21) Appl. No.: 10/955,273

(22) Filed: Sep. 30, 2004

(65) Prior Publication Data

US 2006/0067800 A1     Mar. 30, 2006

(51) Int. Cl.
 *B23C 1/20* (2006.01)
(52) U.S. Cl. .................. 409/131; 409/232; 409/138; 409/140; 415/904; 415/107; 173/212; 173/168; 81/57.44
(58) Field of Classification Search ......... 409/231–232, 409/138–140, 201, 131–132, 237; 408/130, 408/239 R, 236–237, 235; 451/358, 294, 451/295; 415/904, 202, 104, 107; 81/470, 81/57.44; 173/93, 93.5, 212, 168, 218
See application file for complete search history.

(56) References Cited

U.S. PATENT DOCUMENTS 3,407,885 A  * 10/1968  Hoza et al. ............... 173/93.6
3,918,213 A  * 11/1975  Stout ........................ 451/359
4,332,066 A  *  6/1982  Hailey et al. ............... 29/26 R
4,800,802 A  *  1/1989  Rebman ..................... 92/61
5,180,019 A  *  1/1993  Thiry et al. ................ 173/168
5,765,975 A  *  6/1998  Hoffmann et al. .......... 409/138
5,893,420 A  *  4/1999  Schoeps .................... 173/181
6,974,286 B2 * 12/2005  Lawson .................... 409/140
7,137,763 B2 * 11/2006  Lawson .................... 409/140

FOREIGN PATENT DOCUMENTS

EP       0307550      6/1988
GB       2235398      3/1991
JP       60259379    12/1985

* cited by examiner

Primary Examiner—Erica E Cadugan
(74) Attorney, Agent, or Firm—Coats & Bennett, P.L.L.C.

(57) ABSTRACT

The non-axial force exerted on a pneumatic tool by a non-axial air supply is balanced to allow for uniformly radially distributed compliance forces on the tool. An annular air ring is disposed around the pneumatic tool, covering an air inlet port. Air is supplied by any route to a first air passage that supplies the air to the interior of the annular air ring, exerting a force on the annular air ring. Air flows in the annular space of the air ring, entering the tool air inlet port to drive the pneumatic tool. One or more second air passages are connected to the annular air ring in an even radial distribution. Each second air passage is connected to the air source, or terminates in an air blockage, creating a column of pressurized air that exerts a force on the annular air ring equal to the first air passage. The forces exerted on the air ring are thus balanced with respect to the axis of the tool.

35 Claims, 5 Drawing Sheets

FORCE-BALANCED AIR SUPPLY FOR PNEUMATIC TOOLS

BACKGROUND

The present invention relates generally to the field of pneumatic equipment and in particular to an air supply that does not induce side forces on a pneumatic tool.

Pneumatic tool assemblies (comprising a pneumatic tool, a housing, and various support functions such as air supply and regulation) are commonly deployed on robots, computerized numerical control (CNC) equipment, and the like, to perform routine and repetitive tasks. One such task is the deburring of the edges of machined or cast parts. In a typical deburring operation, a deburring tool is directed along a path around the edge of a part or object that is to be deburred.

For several reasons, robotically or numerically controlled deburring tools require some displacement compliance. The programmed path of the robotic arm or numeric equipment may not exactly coincide with the shape or contours of the surface to be deburred. Additionally, the edge or surface of the part being deburred may include cavities or protrusions that deviate from the anticipated path of the tool. Another factor requiring compliance in the deburring tool is variation in the fixtures, or structures that hold the parts while they are being deburred. Fixture variations may result in the surfaces of the parts to be deburred being misaligned with the programmed path of the deburring tool.

Ideally, the compliance force of a deburring tool should be the same in all directions. In practice, uniform compliance is difficult to achieve. For example the weight of a tool, its housing and possibly the actuating arm or member to which it is attached, results in a different compliance response to the same force exerted on the tool from the top and the bottom. The compliance force of a deburring tool may be largely decoupled from its housing and support by, for example, gimbal-mounting the tool within its housing or supporting it by other means, preferably at or near the center of gravity of the tool. A two-axis gimbal allows the tool to move freely in any radial direction, and mounting the gimbal at the tool's center of gravity largely obviates the weight of the tool as a compliance force factor.

However, another factor that adversely affects compliance uniformity is the supply of pressurized air to drive the pneumatic tool. If the air is supplied to the tool at any non-axially-aligned point, it induces a force on the tool that must be countered to maintain the axial alignment of the tool within its housing. This compensation causes a non-uniform compliance response to forces in that direction, with respect to any other direction. Supplying the air axially, such as at the rear of the tool assembly, is impossible in many applications, as this is the preferred mounting point of the tool assembly to a robot arm or numerically controlled equipment, which may not be configured to supply the air.

SUMMARY

In one aspect, the present invention relates to a pneumatic tool assembly having a force-balanced air supply. The assembly comprises a housing and a pneumatic tool having a central axis compliantly mounted in the housing. A non-axial air supply inlet induces a non-axial force on the tool. The assembly further includes a first air passage in airflow relation with the inlet, an annular air supply ring in airflow relation with the first air passage, the ring disposed about the axis of the tool and operative to supply air to the tool; and at least one balancing air passage in airflow relation with the annular air supply ring and operative to oppose the force.

In another aspect, the present invention relates to a method of force-balancing the air supply to a pneumatic tool assembly comprising a housing and a pneumatic tool having a central axis. Air is directed to the tool assembly in a non-axial direction, thereby imparting a non-axial force to the assembly. The air is passed from the inlet via a first air passage to an annular air supply ring disposed about the axis of the tool and operative to supply air to the tool. A portion of the air is passed from the annular air supply ring to at least one balancing air passage to create air pressure in said balancing air passage that is generally equal to that in said first air passage, the balancing air passage operative to oppose the force.

In yet another aspect, the present invention relates to a method of supplying air to a pneumatic tool having a central axis without inducing a force on the tool. An annular air supply ring is disposed axially around the tool, the air supply ring covering an air inlet aperture in the tool. Air is directed to the tool through the annular air supply ring via a first air passage. The annular air supply ring is force-balanced against force induced by air pressure in the first air passage by directing air to at least one balancing air passage, the air pressure in the balancing air passage(s) operative to balance the induced force.

In still another aspect, the present invention relates to a pneumatic tool assembly having substantially equal compliance in all radial directions about a central axis. The assembly includes a housing, a pneumatic tool mounted in the housing, and a compliance force mechanism coupling the pneumatic tool to the housing. The compliance force mechanism is operative to impart a substantially equal compliance force to the pneumatic tool in all radial directions about the axis. The assembly also includes a non-axial air supply inlet in the housing and a first air passage in the housing, in airflow relation with the inlet. The assembly further includes an annular air supply ring in the housing, in airflow relation with the first air passage. The ring is disposed about the axis of the tool and operative to supply air to the tool. The assembly additionally includes at least one balancing air passage in the housing, in airflow relation with the annular air supply ring and operative to oppose a non-axial force induced by the air supply inlet.

In still another aspect, the present invention relates to a deburring tool. The tool has an air supply manifold disposed adjacent the tool for directing air into the tool. The air supply manifold has a non-axial air inlet. The air supply manifold is configured to counterbalance a non-axial force induced by air entering the inlet.

In still another aspect, the present invention relates to a pneumatic tool assembly. The assembly includes a housing and a pneumatic tool disposed in the housing. The assembly also includes an air supply device for supplying air to the tool in a non-axial direction. The assembly further includes means associated with the air supply device for counterbalancing non-axial force induced by air entering the air supply device.

DETAILED DESCRIPTION

Figure 1:
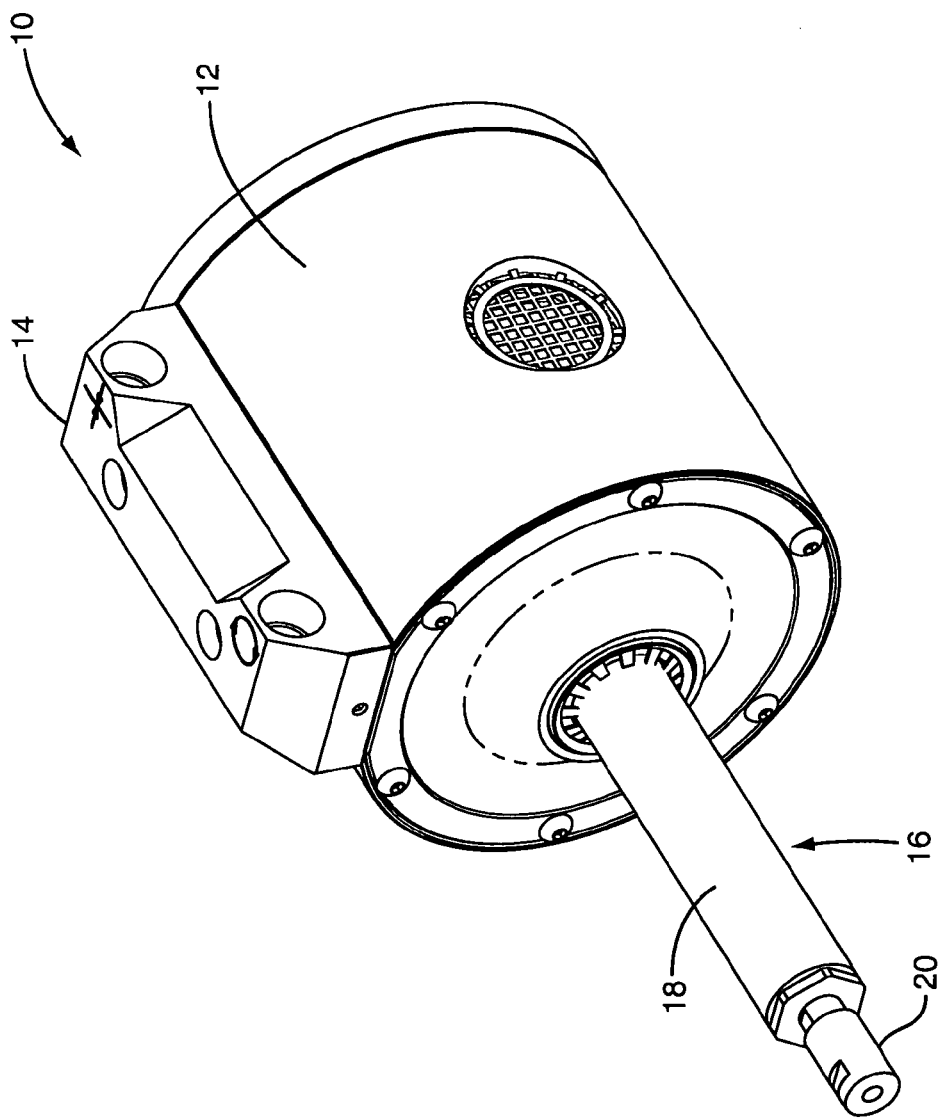
FIG. 1 is a perspective view of a pneumatic deburring tool assembly.

A representative pneumatic tool having a force-balanced air supply—in this example, a deburring tool—is depicted in FIGS. 1, 3, 4A and 4B. The deburring tool assembly, indicated generally by the numeral 10, comprises a housing 12, an air connection block 14 and a pneumatic tool, indicated generally by the numeral 16. As shown in FIG. 1, the pneumatic tool 16 is disposed within the housing 12, with a front portion 18 extending therefrom. The pneumatic tool 16 converts energy from a high-pressure, forced air supply to rotary motion of an axial shaft or spindle 20. A deburring bit may be affixed to the axial shaft 20, to performing deburring operations.

Figure 3:
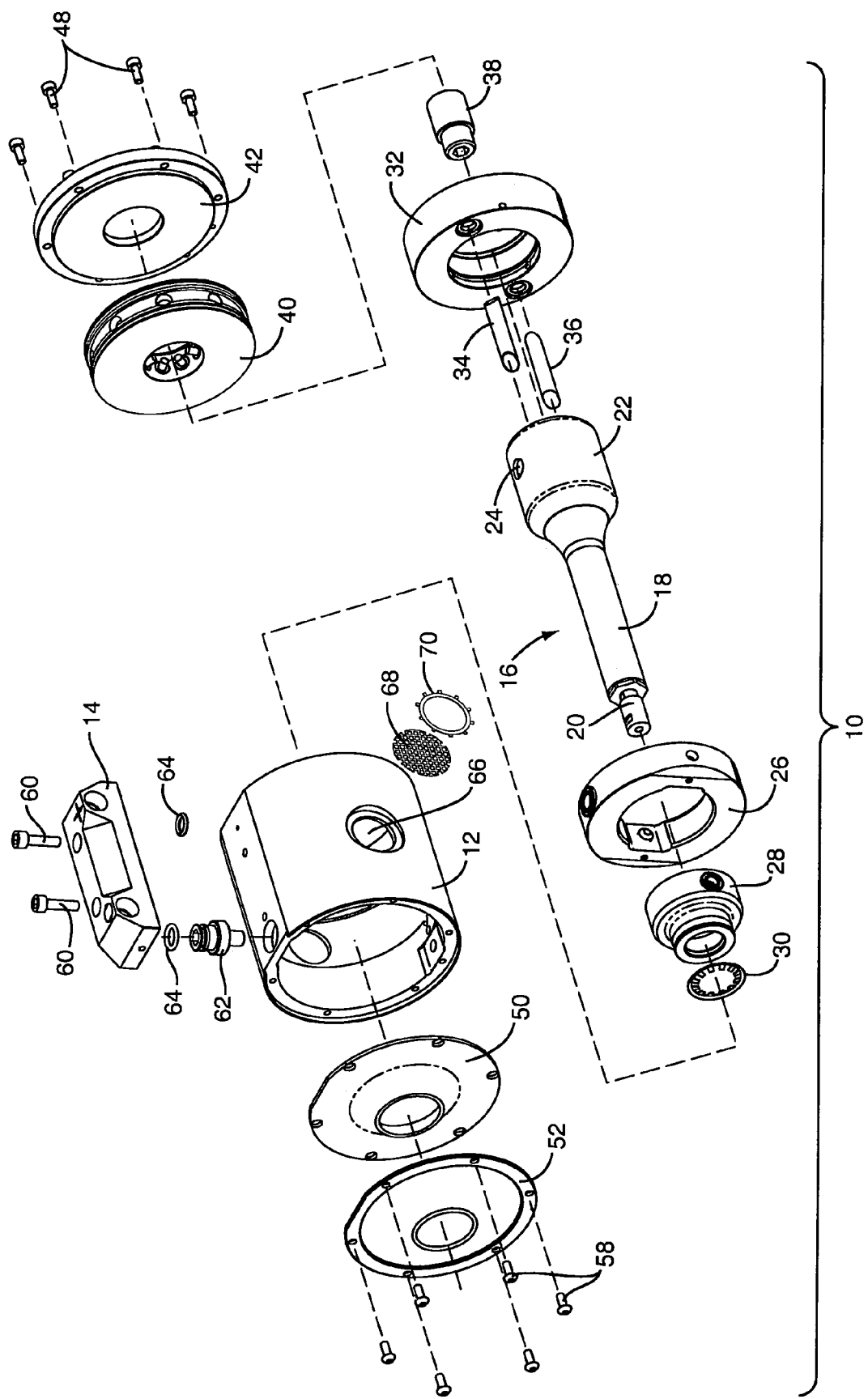
FIG. 3 is an exploded perspective view of a pneumatic deburring tool assembly.

Pneumatic tool 16 is disposed within the housing 12, wherein it is aligned along a central axis by a deformable boot 50, a pivot post 38 and a compliance device 40 (see FIG. 3). By operation of a two-axis gimbal 26 & 28, the tip of pneumatic tool 16 is free to move slightly from the central axis in any radial direction. The tool is biased to an axially aligned (i.e., centered) position within the housing 12 by the compliance device 40 acting upon the pivot post 38.

Turning to FIG. 3, the overall construction of the representative deburring tool assembly 10 is described. The pneumatic tool 16 comprises a front housing portion 18 and a rear housing 22. The pneumatic tool 16 converts high-pressure, forced air input to the air inlet 24 into rotary motion of the axial shaft (spindle) 20. The pneumatic tool 16 is disposed and axially aligned within the housing 12. To allow for radial motion of the spindle 18 from its default, axially aligned position, the pneumatic tool 16 is secured within the housing 12 by a two-axis gimbal comprising gimbal axes 26 and 28. A retention clip 30 secures the front spindle housing 18 of the pneumatic tool 16 within the gimbal axis 28.

According to the present invention, high-pressure, forced air is supplied to the inlet 24 in the rear housing 22 of the pneumatic tool 16 by a force-balanced air supply assembly comprising an annular air supply ring or manifold 32 and two or more air passages, or tubes, 34 and 36. The air passages 34, 36 are disposed evenly around the annular air supply ring 32, e.g., opposed to each other in the pictured case of two air passages 34, 36. The air passages 34, 36 are supported by seals (not shown), and are constrained within limits by their length, yet free to float along their center axes. Thus, the pneumatic tool 16 may pivot about its axis, unconstrained by the connection of the air passages 34, 36. The air passages 34, 36 are preferably of equal length, although the present invention is not limited to this embodiment. The operation of the force-balanced air supply assembly is further described herein.

The pneumatic tool 16 is effectively suspended or supported about its center of gravity by gimbals 26 & 28. This enables the tip of the pneumatic tool 16 to freely articulate radially in any direction while preventing free rotation about the tool's longitudinal axis. A compliance device 40, disposed circumferentially around the pivot post 38 is operative to center the pneumatic tool 16 along a longitudinal axis of the pneumatic tool assembly 10, and to supply a compliance force biasing the pneumatic tool 16 towards the axially centered position with a generally even force in all radial directions from the central axis. The compliance device 40 comprises an array of circumferentially disposed force generating elements, such as pistons, each of which exerts a force on the surface of the pivot post 38, directed toward the central axis. The force generating elements are arrayed evenly around the circumference of the compliance device 40, and exert a generally equal force, resulting in a default positioning of the pneumatic tool 16 along a central axis, and exerting an equal compliance force opposing displacement of the pneumatic tool 16 in any radial direction.

A rear housing plate 42 secures the pneumatic tool 16 and other components of the pneumatic tool assembly 10 within the housing 12, and is secured to the housing 12 with a plurality of fasteners 48. Similarly, on the front end of the housing 12, a deformable boot 50 and securing ring 52 are secured to the housing 12 via a plurality of fasteners 58. The deformable boot 50 and securing ring 52 secure the pneumatic tool 16 and other components of the pneumatic tool assembly 10 within the housing 12, while allowing the front spindle housing 18 of the pneumatic tool 16 to deviate radially from a default axial position.

The air block 14 is secured to the housing 12 by fasteners 60, providing air flow passages to both the compliance unit and air motor of the pneumatic tool assembly 10, sealed with O-rings 64. In particular, the air block 14 joins with a pivot fitting 62 for supplying high-pressure, forced air to the pneumatic tool 16. Air exiting the pneumatic tool is exhausted through one or more exit ports 66 formed in the housing 12 through a filter 68 secured by retention element 70.

Ideally, the compliance force biasing the pneumatic tool front section 18 to an axially aligned position should be the same in every radial direction. That is, for example in a deburring operation, a deburring bit tracking along an upper surface of a work piece should exhibit the same compliance force as when the tool is deburring a lower surface of the work piece without any change due to gravitational forces. However, the introduction of a forced air supply to the pneumatic tool 16 in a non-axial direction imparts a torque on the pneumatic tool 16, resulting in non-uniform compliance forces distributed radially about the central axis.

Figure 2:
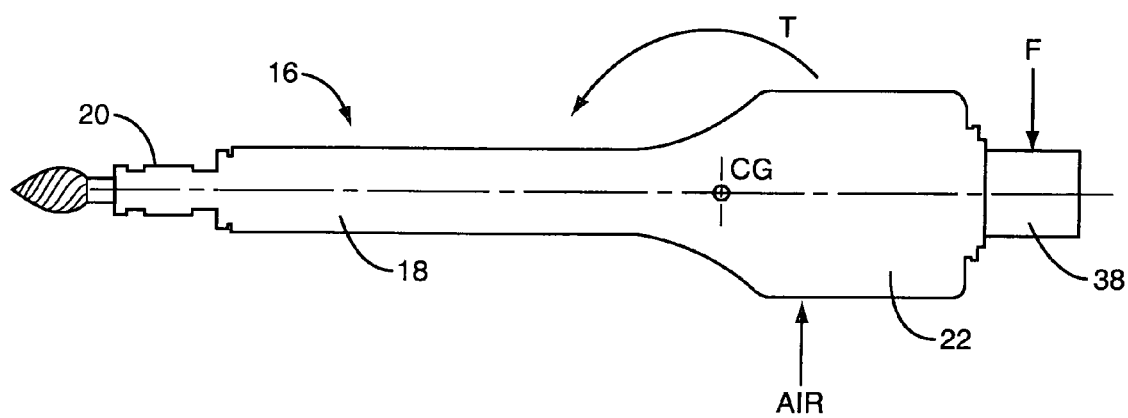
FIG. 2 is free body diagram of a pneumatic deburring tool, depicting forces acting thereon.

FIG. 2 is a free body diagram depicting the pneumatic tool 16, with a high-pressure, forced air supply inlet at an arbitrary non-axial position away from the center of gravity, such as in the rear housing 22. The force of air entering the pneumatic tool 16 induces a torque on the tool about its center of gravity, in the example of FIG. 2, a counter-clockwise torque labeled T. As the pneumatic tool 16 is free to pivot about its center of gravity (assuming it is moveably supported in the housing 12 at that point), the torque T causes a displacement of the tool 16 in a counterclockwise direction, as viewed in FIG. 2. A compliance mechanism maintaining the pneumatic tool 16 in an axial alignment must therefore exert a greater reaction force F in a direction to overcome the effects of the torque induced by the forced air supply. This will result in non-uniform compliance forces distributed radially around the axis.

According to the present invention, the force induced on the pneumatic tool 16 by the high-pressure, forced air supply is balanced radially around the pneumatic tool 16, and hence does not alter the radial distribution of compliance forces imparted by the compliance device 40. Rather than provide air at a point source, according to the present invention air is provided to the pneumatic tool 16 by an annular air ring 32, positioned to cover the air inlet 24 in the pneumatic tool 16. High-pressure, forced air is supplied to the annular air ring 32 by a first air passage, or tube, 34. To balance the mechanical force induced on the annular air ring 32, and subsequently on the pneumatic tool 16, by the air in the first air passage, a second air passage, or tube, 36 is connected in airflow relationship with the annular air ring 32, and is disposed generally opposite, or 180° around the circumference from, the first air passage 34.

The second air passage 36 is preferably generally the same length as the first air passage 34, and may terminate in an air blockage. That is, the second air passage 36 in one embodiment is not operative to pass air from the annular air ring 32 to any other component. In this case, a static air column develops in the second air passage 36, that exerts a mechanical force on the annular air ring 32 that is equal and opposite in direction to that exerted by the first air passage 34. When one or more air balancing passages 36 are disposed about the annular air ring 32 in a generally even radial distribution, the forces exerted by the second (and subsequent) air passages 36 will counter, or balance, the force induced by the first air passage 34 with respect to the axis of the pneumatic tool 16.

In an alternative embodiment, the second air passage 36 may be connected to the same forced air source as the first air passage 34. In this case, air is provided to the annular air ring 32 via each air passage 34, 36, inducing an equal force on the annular air ring 32. If the air passages 34, 36 (or more) are distributed generally evenly around the annular air ring 32, no net non-axial force is induced on the air ring 32, and hence on the pneumatic tool 16.

Figure 5A:
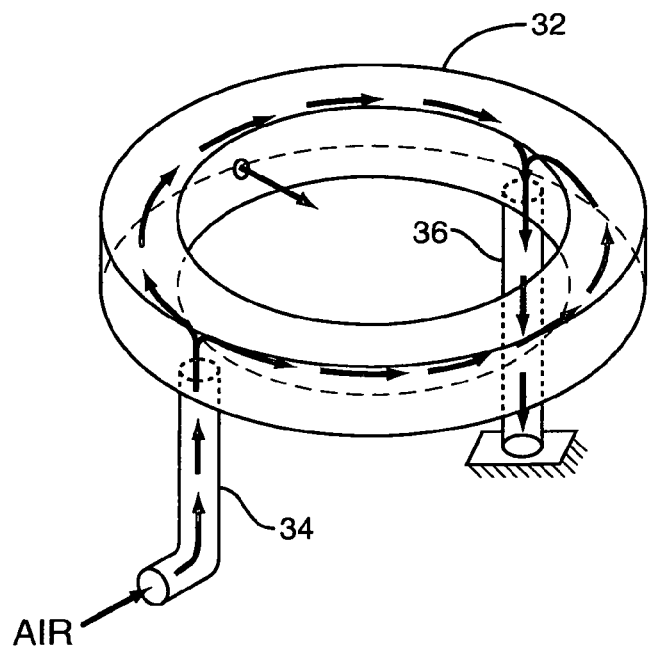
FIG. 5 is a free body diagram depicting airflow in air passages and an annular air supply ring.
Figure 5B:
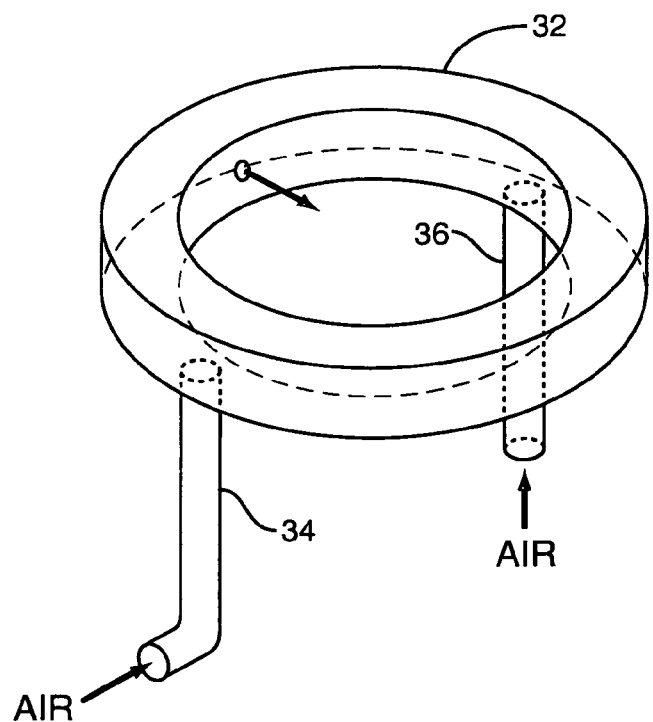

The airflow through the force-balanced air supply (in the case of a blocked second air passage 36) is depicted in the free body diagram of the annular air ring 32 and first and second air passages 34, 36 depicted in FIG. 5A. FIG. 5B depicts the airflow through the force-balanced air supply in the case that both the first and second air passages 34, 36 supply air to the annular air ring 32. Note that FIGS. 5A and 5B depict the annular air ring 32 as a sealed member, with an air passage in the inner surface thereof providing air to the pneumatic tool 16. In reality, as depicted in FIG. 3, the annular air ring 32 has no such inner surface, rather, it seals against the outer surface of the rear portion 22 of the pneumatic tool 16, over the inlet 24, through which it supplies high-pressure, forced air to drive the pneumatic tool 16. Nevertheless, the airflows depicted in FIGS. 5A and 5B are accurate when the annular air ring 32 is disposed over the rear housing portion 22 of the pneumatic tool 16.

Figure 4B:
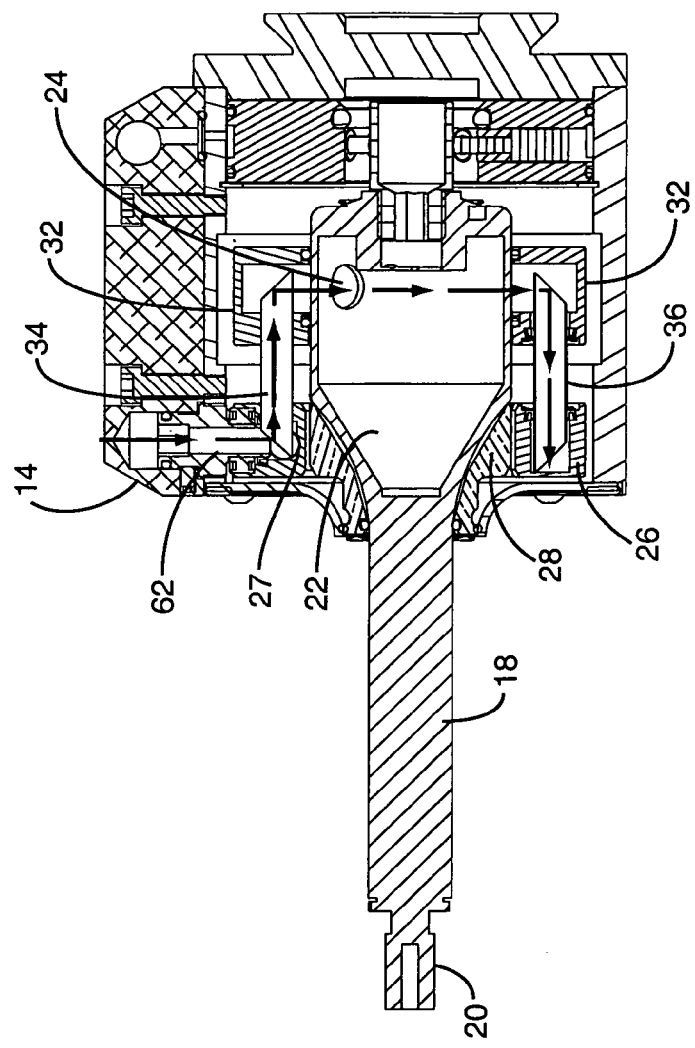
FIG. 4B is a section view of a pneumatic deburring tool assembly.
Figure 4A:
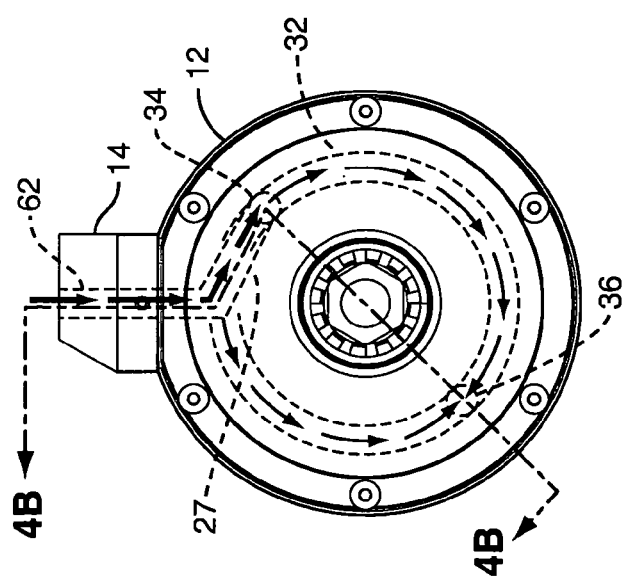
FIG. 4A is an end view of a pneumatic deburring tool assembly.

FIGS. 4A and 4B also depict the input airflow in the pneumatic tool assembly 10 (also for the case in which the second air passage 36 is blocked opposite the annular air ring 32). FIG. 4B is a complex section view, taken along the section line 4B-4B as indicated in FIG. 4A. The airflow is indicated in FIG. 4B by a dashed line with arrows indicating airflow direction. High-pressure, forced air enters the pneumatic tool assembly 10 through the pivot fitting 62 disposed in the air block 14. In the representative pneumatic tool assembly of FIGS. 4A and 4B, the airflow enters through the pivoting axis of the outer gimbal element 26. The air then flows through a cross-drilled passage or tunnel 27 formed in the outer gimbal element 26. The cross-drilled passage 27 allows the air passages 34, 36 to be radially offset from the axes of the gimbal elements 26, 28, thus saving space. Neither the offset of the air passages 34, 36 nor the cross-drilled air passage 27 through the outer gimbal element 26 is critical to the present invention.

The cross-drilled passage brings the input air supply into contact with the input air passage 34, which carries the air to the interior of the annular air ring 32. In so doing, a mechanical force is exerted on the annular air ring 32 at the point of contact with the air passage 34, in a direction toward the rear of the pneumatic tool assembly 10. Air then flows circumferentially around the rear housing 22 of the pneumatic tool 16, within the annular air ring 32, and through the input port 24 to drive the pneumatic tool 16. Some of the air flowing within the annular air ring 32 additionally flows down the second air passage 36, to an air blockage. This creates a column of pressurized air in the second air passage 36 that is equal to the air pressure in the first air passage 34, exerting a mechanical force on the annular air ring 32 at the point of contact with the air passage 36, in a direction toward the rear of the pneumatic tool assembly 10. As the pressurized air in the second air passage 36 exerts a force against the annular air ring 32 that is equal to and opposite in direction to the force of air pressure in the first air passage 34, the net force exerted on the annular air ring 32 is balanced with respect to the axis of the pneumatic tool 16. That is, the force exerted by air pressure in the first air passage 34 is precisely countered, or balanced by force exerted by an equal air pressure in the second air passage 36. In this manner, high-pressure, forced air is supplied to the pneumatic tool 16 without imparting any non-axial force on or disturbing torque to the pneumatic tool 16. Thus, the radially compliance forces exerted on the pneumatic tool 16 by the compliance device 40 remain uniformly distributed. Note that the same effect is achieved by supplying input air through both air passages 34 and 36, if the air passages 34, 36 are connected to the same air supply.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A pneumatic tool assembly having a force-balanced air supply, comprising:
   a housing;
   a pneumatic tool having a central axis compliantly mounted in said housing;
   a non-axial air supply inlet in said tool;
   a first air passage in airflow relation with said inlet;
   an annular air supply ring in airflow relation with said first air passage, said ring disposed about the axis of the tool and operative to supply air to the tool; and
   at least one balancing air passage in airflow relation with said annular air supply ring and operative to oppose a non-axial force induced by air flowing through said air supply inlet.

2. The assembly of claim 1 wherein at least one said balancing air passage connects to said annular air supply ring opposite said first air passage and terminates in an airflow blockage.

3. The assembly of claim 1 wherein at least one said balancing air passage connects to said annular air supply ring opposite said first air passage and is connected in airflow relation with said inlet.

4. The assembly of claim 3 wherein all said balancing air passages are substantially the same length as said first air passage.

5. The assembly of claim 1 wherein said first air passage and said at least one balancing air passage are disposed with generally even radial spacing around said air supply ring.

6. The assembly of claim 1 wherein said first air passage and said at least one balancing air passage are disposed generally parallel to said axis.

7. The assembly of claim 1 wherein said pneumatic tool is mounted in said housing via a gimbal.

8. The assembly of claim 7 wherein said gimbal is a two-axis gimbal allowing displacement of said tool central axis from alignment with a central axis of said housing in any radial direction.

9. The assembly of claim 7 wherein said air supply inlet coincides with one axis of said gimbal.

10. A method of force-balancing the air supply to a pneumatic tool assembly comprising a housing having a central axis and an air block operative to receive a supply of pressurized air and a pneumatic tool, comprising:
    directing air to said tool assembly through said air block in a non-axial direction, thereby imparting a non-axial force to said assembly;
    passing air from said air block via a first air passage to an annular air supply ring disposed circumferentially about the tool and operative to supply air to the tool; and
    passing a portion of said air from said annular air supply ring to at least one balancing air passage to create air pressure in said at least one balancing air passage that is generally equal to that in said first air passage, said at least one balancing air passage operative to oppose said force.

11. The method of claim 10 wherein said at least one said balancing air passage is disposed between said annular air supply ring and an air blockage.

12. The method of claim 10 wherein said at least one said balancing air passage is disposed between said annular air supply ring and an air source.

13. The method of claim 10 wherein all said balancing air passages are substantially the same length as said first air passage.

14. The assembly of claim 10 wherein said first air passage and said at least one balancing air passage are disposed with generally even radial spacing around said air supply ring.

15. The assembly of claim 10 wherein said first air passage and said at least one balancing air passage are disposed generally parallel to said axis.

16. A method of supplying air to a pneumatic tool having a central axis without inducing a force on said tool, comprising:
    disposing an annular air supply ring axially around said tool, said air supply ring covering an air inlet aperture in said tool;
    directing air to said tool through said annular air supply ring via a first air passage; and
    force-balancing said annular air supply ring against force induced by air pressure in said first air passage by directing air to at least one balancing air passage, the air pressure in said at least one balancing air passage operative to balance said induced force.

17. The method of claim 16 wherein said first air passage and said at least one balancing air passage are disposed with generally even radial spacing around said air supply ring.

18. The method of claim 16 wherein all said balancing air passages are substantially the same length as said first air passage.

19. The method of claim 16 wherein at least one said balancing air passage is disposed between said annular air ring and an air blockage.

20. The method of claim 16 further comprising directing air to said tool through said annular air supply ring via at least one said balancing air passage.

21. A pneumatic tool assembly having substantially equal compliance in all radial directions about a central axis, comprising:
    a housing;
    a pneumatic tool mounted in said housing;
    a compliance force mechanism coupling said pneumatic tool to said housing, said compliance force mechanism operative to impart a substantially equal compliance force to said pneumatic tool in all radial directions about said axis;
    a non-axial air block in said housing, operative to receive a supply of pressurized air;
    a first air passage in said housing, in airflow relation with said air block;
    an annular air supply ring in said housing, in airflow relation with said first air passage, said ring disposed about the axis of the tool and operative to supply air to the tool; and
    at least one balancing air passage in said housing, in airflow relation with said annular air supply ring and operative to oppose a non-axial force induced by air flowing through said air block.

22. The assembly of claim 21 wherein said compliance force mechanism comprises a plurality of compliance force members arrayed radially about said axis, said compliance force members biasing said pneumatic tool to an axially aligned position.

23. A deburring tool having a central axis and an air supply manifold disposed adjacent the tool for directing air into the tool, the air supply manifold having a non-axial air input, and wherein the air supply manifold is configured to counterbalance a non-axial force induced on the deburring tool by air entering the input of the air supply manifold.

24. The tool of claim 23 wherein the non-axial air input comprises a first air passage, and wherein the air supply manifold includes at least one balancing air passage.

25. The tool of claim 24 wherein at least one balancing air passage terminates in an air blockage, opposite the first air passage.

26. The tool of claim 24 wherein the non-axial air input comprises said first air passage and at least one said balancing air passage.

27. The tool of claim 24 wherein the first air passage and the at least one balancing air passage are disposed generally evenly around the air supply manifold.

28. The tool of claim 23 wherein the air supply manifold extends at least partially around the tool.

29. The tool of claim 28 wherein the air supply manifold comprises an annular ring that extends around the tool.

30. A pneumatic tool assembly having a central axis, comprising:
    a pneumatic tool disposed in a housing;
    a gimbal disposed in the housing and moveably supporting the tool;
    an air supply manifold disposed in the housing, axially spaced from the gimbal and operative to supply air to an air inlet in the tool;
    wherein air is directed through the gimbal, and subsequently to the air supply manifold.

31. The assembly of claim 30 further comprising a compliance device disposed in the housing and axially spaced from the air supply manifold, the compliance device providing a compliance force biasing the pneumatic tool to an axially aligned position in the housing.

32. The assembly of claim 31 wherein the air supply manifold is disposed between the gimbal and the compliance device.

33. A pneumatic tool assembly having a central axis, comprising:
    a housing;

a pneumatic tool having a longitudinal axis disposed in the housing such that the tool longitudinal axis is generally aligned with the assembly central axis;

air supply device for supplying air to the tool in a non-axial direction; and means associated with the air supply device for counterbalancing non-axial force induced on the pneumatic tool by air entering the air supply device.

34. The assembly of claim 33, further comprising compliance means for biasing the longitudinal axis of the tool to a position aligned with the tool assembly central axis.

35. The assembly of claim 33, further comprising support means for supporting the tool in the housing while allowing for non-central-axis-aligned motion of the tool within the housing.

\* \* \* \* \*